United States Patent
Pellerite et al.

(10) Patent No.: US 11,036,216 B2
(45) Date of Patent: Jun. 15, 2021

(54) VOICE-CONTROLLABLE UNMANNED AERIAL VEHICLE FOR OBJECT RETRIEVAL AND DELIVERY

(71) Applicant: INTERNATIONAL BUSINESS MACHINES CORPORATION, Armonk, NY (US)

(72) Inventors: Amanda Pellerite, Raleigh, NC (US); Sonia Patel, Ann Arbor, MI (US); Katherine Litscher, Morrisville, NC (US); Christopher Florence, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

(21) Appl. No.: 16/142,829

(22) Filed: Sep. 26, 2018

(65) Prior Publication Data

US 2020/0096999 A1    Mar. 26, 2020

(51) Int. Cl.
| | |
|---|---|
| *G05D 1/00* | (2006.01) |
| *B64C 39/02* | (2006.01) |
| *G06F 3/16* | (2006.01) |
| *G10L 15/22* | (2006.01) |
| *G06N 3/08* | (2006.01) |
| *G06K 9/00* | (2006.01) |

(52) U.S. Cl.
CPC ......... *G05D 1/0016* (2013.01); *B64C 39/024* (2013.01); *G06F 3/167* (2013.01); *G06K 9/0063* (2013.01); *G06N 3/08* (2013.01); *G10L 15/22* (2013.01); *B64C 2201/128* (2013.01); *B64C 2201/146* (2013.01); *G10L 2015/223* (2013.01)

(58) Field of Classification Search
CPC ..... G05D 1/0016; B64C 39/024; G06F 3/167; G06K 9/0063; G06N 3/08; G10L 15/22
See application file for complete search history.

(56) References Cited

U.S. PATENT DOCUMENTS

| | | |
|---|---|---|
| 9,600,941 B2 | 3/2017 | Berger et al. |
| 9,870,549 B2 | 1/2018 | Amacker |
| 9,921,579 B1 | 3/2018 | Schaffalitzky |

(Continued)

OTHER PUBLICATIONS

"Using Voice Commands and AI to Control Vehicle Automation," IP.com, IPCOM000250373D, Jul. 6, 2017, 3 pages.

(Continued)

*Primary Examiner* — Adam M Alharbi
(74) *Attorney, Agent, or Firm* — Cantor Colburn LLP; Teddi Maranzano

(57) ABSTRACT

Described herein are systems, devices, methods, computer-readable media, techniques, and methodologies for object retrieval and delivery using an unmanned aerial vehicle (UAV) such as a drone. The UAV receives user input from a user such as audial input and processes the input to determine a user command. The user command can be a command to retrieve an object that is out of reach of the user. The UAV scans the environment capturing image data using on-board sensors. The image data can be fed to a neural network trained in object detection to identify the object in the environment. Once identified, the UAV can then navigate to the object, retrieve the object, and deliver the object to a target individual or location such as a location adjacent to the user.

18 Claims, 5 Drawing Sheets

(56) References Cited

U.S. PATENT DOCUMENTS

| | | |
|---|---|---|
| 2010/0073363 A1 | 3/2010 | Densham |
| 2014/0254896 A1 | 9/2014 | Zhou |
| 2017/0132562 A1 | 5/2017 | High |
| 2017/0286892 A1 | 10/2017 | Studnicka |
| 2018/0114420 A1 | 4/2018 | Siminoff et al. |
| 2018/0130001 A1 | 5/2018 | Gupte |
| 2019/0011921 A1* | 1/2019 | Wang ................... G06T 7/70 |
| 2019/0378423 A1* | 12/2019 | Bachrach .............. G06T 19/003 |
| 2020/0073385 A1* | 3/2020 | Jobanputra ............. G06F 9/547 |

OTHER PUBLICATIONS

"Method for Optimum Viewpoint for Drone Photography Based on User Commands," IP.com, IPCOM000239970D, Dec. 8, 2014, 4 pages.

* cited by examiner

VOICE-CONTROLLABLE UNMANNED AERIAL VEHICLE FOR OBJECT RETRIEVAL AND DELIVERY

BACKGROUND

The present invention relates generally to object retrieval and delivery, and more particularly, to voice-controllable unmanned aerial vehicles for object retrieval and delivery.

Unmanned aerial vehicles (UAVs) such as drones have been become increasingly popular among hobbyists and consumers in recent years as more models at affordable price points have become available. Drones can be utilized by the average consumer/hobbyist to capture aerial footage, for example. Drones are typically controlled using a handheld controller having an interactive display to navigate the drone, receive video feedback from the drone when used at a distance, and so forth. A drone may also include other components to assist with navigation such as a joystick or the like.

SUMMARY

In one or more example embodiments, a method for object retrieval and delivery executable on an unmanned aerial vehicle (UAV) is disclosed. The method includes detecting, by a computer processor of the UAV, user input in an environment surrounding a user and the UAV, and processing, by the computer processor, the user input to determine that the user input represents a user command to retrieve an object present in the environment. The method further includes capturing, by one or more sensors of the UAV, image data of the environment, detecting the object in the environment based at least in part on the image data, and causing, by the computer processor, the UAV to navigate to a location of the object in the environment to retrieve the object. The method finally includes causing, by the computer processor, the UAV to perform a subsequent action after retrieval of the object.

In one or more other example embodiments, an unmanned aerial vehicle (UAV) is disclosed. The UAV includes at least one memory storing computer-executable instructions and at least one processor configured to access the at least one memory and execute the computer-executable instructions to perform a set of operations. The operations include detecting user input in an environment surrounding a user and the UAV, and processing the user input to determine that the user input represents a user command to retrieve an object present in the environment. The operations further include capturing, by one or more sensors of the UAV, image data of the environment, detecting the object in the environment based at least in part on the image data, and causing the UAV to navigate to a location of the object in the environment to retrieve the object. The operations finally include causing the UAV to perform a subsequent action after retrieval of the object.

In one or more other example embodiments, a computer program product for object retrieval and delivery using an unmanned aerial vehicle (UAV) is disclosed. The computer program product includes a non-transitory storage medium readable by a processing circuit of the UAV, the storage medium storing instructions executable by the processing circuit to cause a method to be performed. The method includes detecting user input in an environment surrounding a user and the UAV and processing the user input to determine that the user input represents a user command to retrieve an object present in the environment. The method further includes capturing, by one or more sensors of the UAV, image data of the environment, detecting the object in the environment based at least in part on the image data, and causing the UAV to navigate to a location of the object in the environment to retrieve the object. The method finally includes causing the UAV to perform a subsequent action after retrieval of the object.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
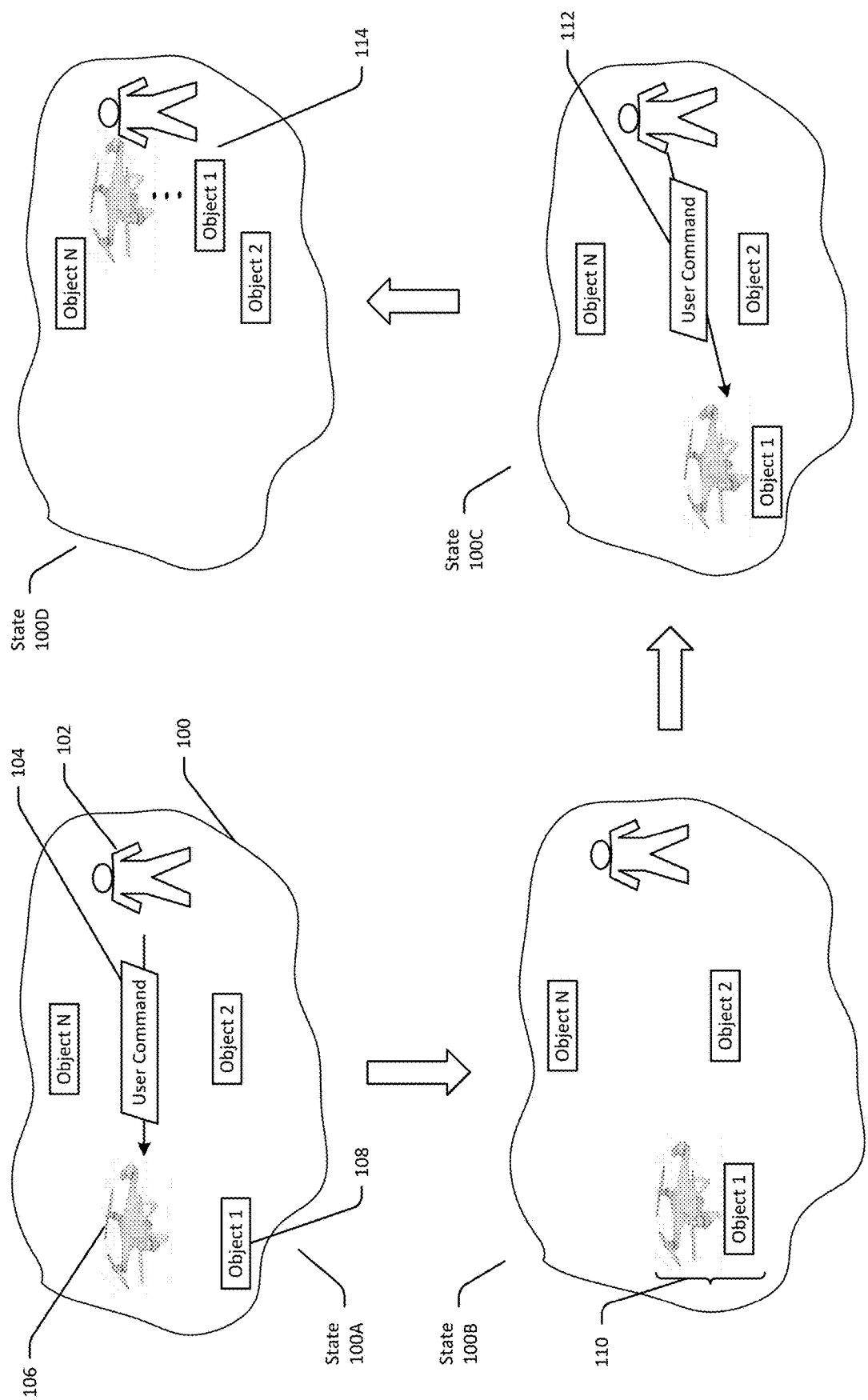
FIG. 1 is a schematic diagram illustrating various states associated with object retrieval and delivery using an unmanned aerial vehicle (UAV) in accordance with one or more example embodiments.

Example embodiments relate to, among other things, systems, devices, methods, computer-readable media, techniques, and methodologies for object retrieval and delivery using an unmanned aerial vehicle (UAV) such as a drone. In example embodiments, a UAV detects input in an environment that includes the UAV and a user. The UAV may, for example, operate in a default low-power "await input" mode while waiting to detect input in the environment. In the "await input" mode, the UAV may be hovering above a surface or may be stationary such as at a "home" location of the UAV. The input may be audial input received from the user. Alternatively, the user input may be gesture-based input or input provided to the UAV via a handheld controller operable by the user. In example embodiments, the UAV may be configured to perform natural language processing of the received input to, for example, identify a user command to which the input corresponds. For example, the UAV may be configured with voice recognition and speech-to-text capabilities to parse the user input into a word or phrase representative of a user command. Alternatively, the UAV may relay the user input to a remote system configured to perform the natural language processing on the input and return an indication of the corresponding user command to the UAV.

In example embodiments, any of a variety of user commands may be issued to the UAV. Example user commands may include, without limitation, "take off," "land," "fly forward," "pick up an object," "drop off the object," and so forth. In example embodiments, if the user command is "pick up [name of object]," the UAV may begin to traverse the environment using a collection of on-board cameras and/or other sensors to capture sensor data such as image data of the environment. While capturing the image data, the UAV may traverse a predefined default flight path or a customized flight path that is more likely to result in earlier detection of the desired object.

In example embodiments, the UAV may send the captured image data to a remote system (e.g., one or more remote servers) that may be configured to perform object detection based on the received image data. For instance, in example embodiments, the remote system may be configured to utilize a trained neural network (e.g., a convolutional neural network) to classify objects from the image data and ultimately detect the object corresponding to the user command. In example embodiments, the neural network may have been trained using training image data supplied by the UAV. For instance, the UAV may have previously conducted various test flights to capture image data of the environment used as training data to train the neural network. In alternative example embodiments, if the UAV has sufficient data storage and processing capacity, the UAV may execute the trained neural network on-board and perform the object recognition/detection itself.

Once the object is detected, the remote system may send an indication that the object has been detected to the UAV. In example embodiments, the remote system may also send various metadata associated with the object to the UAV. For instance, the UAV may receive from the remote system Global Positioning System (GPS) coordinates indicative of a location of the object in the environment. The UAV may be equipped with a GPS receiver that enables the UAV to navigate to the location of the object in the environment using the received GPS coordinates of the object's location. In addition, in example embodiments, the remote system may provide the UAV (or the UAV may independently determine) a most efficient flight path for retrieving the object. The most efficient flight path may be determined based on default or customizable parameters such as distance, time, number of potential obstacles along the flight path, or the like.

In example embodiments, the UAV may also receive other metadata associated with the object such as information identifying one or more attributes of the object. For instance, the UAV may receive metadata indicating one or more materials from which the object is constructed. The UAV may also receive from the remote system (or independently determine using data stored on-board the UAV) information indicative of a relative fragility of a material of the object and information indicative of a manner in which the object is to be retrieved based on its relative fragility. The manner in which a UAV retrieves an object may be referred to herein as a retrieval protocol and may include, without limitation, the mechanism used to grasp the object (e.g., a mechanical arm); the amount of force applied when grasping the object; a location on the object at which to grasp the object; and so forth. For example, if the UAV determines that the object is primarily constructed from glass, the UAV may not use more than a threshold amount of force while retrieving the object or may utilize a special grasping mechanism such as an arm having suction features to retrieve the object. On the other hand, if the object is primarily constructed from a sturdier material such as wood or metal, the UAV utilize a greater amount of force to grasp the object. In certain example embodiments, there may be some ambiguity as to the relative fragility of an object, in which case, the user command itself may convey this information to the UAV. An example user command in such a scenario may be "pick up the fragile wooden sculpture."

In example embodiments, the UAV may be pre-programmed to be aware of a maximum amount of object mass that the UAV is capable of grasping and lifting. In certain example embodiments, the UAV may receive metadata from the remote system indicative of the mass of a detected object, or alternatively, determine or approximate the mass of the object itself based, for example, on pre-programmed data or knowledge of material properties of the object. In some example embodiments, the UAV may determine beforehand that an object is too massive to be grasped and picked up. In other example embodiments, the UAV may weigh the object upon initially picking it, and if the measured weight exceeds the UAV's allowable weight threshold, may return the object to its location. In yet other example embodiments, the UAV may grasp the object and attempt to fly with the object, and if the UAV determines that one or more flight safety parameters are not met (e.g., a suitable altitude or velocity cannot be maintained), the UAV may return the object to its location.

Once the UAV retrieves the object (e.g., grasps the object), it may again re-enter the "await input" mode to wait for a follow-up user command. While in this "await input" mode, the UAV may hover above or the vicinity of the location from the object was retrieved, remain stationary on a ground surface, or the like. While in the "await input" mode with the object having been retrieved, the UAV may detect additional user input and perform natural language processing on the additional user input to determine that the additional user input is representative of a follow-up user command. The follow-up user command may be, for example, any suitable command relating to the object such as "hold the object for X minutes," "bring the object to me," "drop the object off at [a specified location]," or the like.

For user commands directing the UAV to bring the object to the user or to drop the object off at a specified location, the UAV may utilize the on-board GPS receiver to navigate to the user's location or another specified location using corresponding GPS coordinates. In other example embodiments, the user command may be a directive to deliver the object to another specified individual present in the environment. It should be appreciated that variations of example user commands described herein (e.g., variations in phrasing) are also within the scope of this disclosure. In example embodiments, if no follow-up user command is received within a predetermined amount of time, the UAV may default to a standard setting which may include delivering the object to a default target location in the environment. The default target location may be a current location of the user or some other default location.

In example embodiments, the UAV may rely on the object recognition/detection performed either on-board the UAV or by a remote system to identify attributes of the object that may impact the manner in which the object is released or delivered to a target individual or location. For instance, the UAV may determine that the object is sharp, heavy, or otherwise presents a potential danger (e.g., the object is a knife) and may release the object at a slower rate and/or at a location that is a safe but accessible distance away from a target individual (e.g., the user that issued the user command or another specified individual).

In example embodiments, a UAV may be programmed to perform a series of actions based on pre-programmed user commands or predetermined timestamps. For example, the UAV may be programmed to perform a series of actions, each of which corresponds to a specific pre-programmed user command. For instance, if a user issues the user command "step 1 done," the UAV may have programmed knowledge of an action it needs to perform in response to this user command, and may automatically perform the action (e.g., retrieve and deliver a particular object) in response to receiving the user command without any further user input needed. Similarly, the UAV may automatically perform subsequent actions upon detecting user commands "step 2 is done," "step 3 is done," and so forth. In other example embodiments, a UAV may be programmed to perform a series of actions at designated timestamps. For instance, after the expiry of a first predetermined time period, the UAV may perform a specific corresponding action. After performing the action, the UAV may wait a second predetermined time period, at the expiration of which, the UAV may perform a subsequent corresponding action, and so on. In some example embodiments, the user may override the UAV's programming by providing a user command requesting that the UAV wait an additional period of time before performing an action (e.g., "wait 10 more minutes to get me object X"); requesting that the UAV wait to perform the action until a specific future user command is received (e.g., "don't do anything further until I tell you to"); and so forth.

Example embodiments of the invention are applicable to any number of example use case scenarios. Example embodiments can be used, for example, to assist an individual engaging in home improvement activities (e.g., a carpenter, a plumber, a homeowner working on a do-it-yourself project, etc.). For instance, an individual may be attempting to assemble a piece of furniture alone, and at some point during the assembly process, may need to retrieve a drill that is laying beyond the reach of the individual because the individual needs to hold up a heavy component of the furniture and cannot move her location. Without the solution provided by example embodiments of the invention, the individual would need someone else to retrieve the drill (if someone else is even present) or release the heavy component, retrieve the drill, and pick up the heavy component again, which may not be feasible, or at a minimum, would add delay and inefficiency to the assembly process.

Example embodiments of the invention, however, ameliorate this situation by allowing the individual to provide voice commands to a UAV to retrieve a desired object (e.g., the drill from the example scenario described above). In response, the UAV can scan the environment, detects the desired object, navigates to the object, retrieves the object, and returns the object to a desired location (e.g., a location in proximity to the individual). In this manner, the individual can continue with the assembly process without introducing unwanted delay or inefficiency. It should be appreciated that example embodiments of the invention are applicable to any number of other example scenarios including, without limitation, disabled individuals whose movement is impaired and would benefit from having objects retrieved and delivered to them by a UAV; surgeons who would benefit from having surgical tools retrieved and delivered to them by a UAV without having to detract attention away from the patient; and so forth.

Example embodiments provide various technical features, technical effects, and improvements to technology. Example embodiments, for example, provide the technical effect of improving the ease and efficiency and reducing the delay associated with performing a task that requires using different objects (e.g., tools) at different times, at least some of which may be out of arm's reach of an individual performing the task. Example embodiments achieve this technical effect based at least in part on technical features of the invention that provide an automated solution for retrieving and delivering desired objects to a target individual or location using a UAV that responds to user commands such as voice commands. Example embodiments also achieve the technical effect of improved efficiency and reduced time/effort to complete a task (e.g., an assembly task) based at least in part on technical features that allow a UAV to be programmed to perform a series of actions based on pre-programmed user commands or at predetermined timestamps. Example embodiments also achieve the technical effect of improved efficiency and reduced time/effort to complete a task or a step of a task (e.g., retrieving and delivering a desired object) based at least in part on technical features that utilize a trained neural network to improve the accuracy and reduce the time required to identify the object and its location in the environment. These illustrative technical effects and technical features constitute a technical improvement over conventional methodologies for performing tasks that require different objects at different times to complete the tasks.

Various illustrative methods and corresponding data structures associated therewith will now be described. It should be noted that each operation of the methods 300 and 400 may be performed by one or more of the program modules or the like depicted in FIG. 2 or 5, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
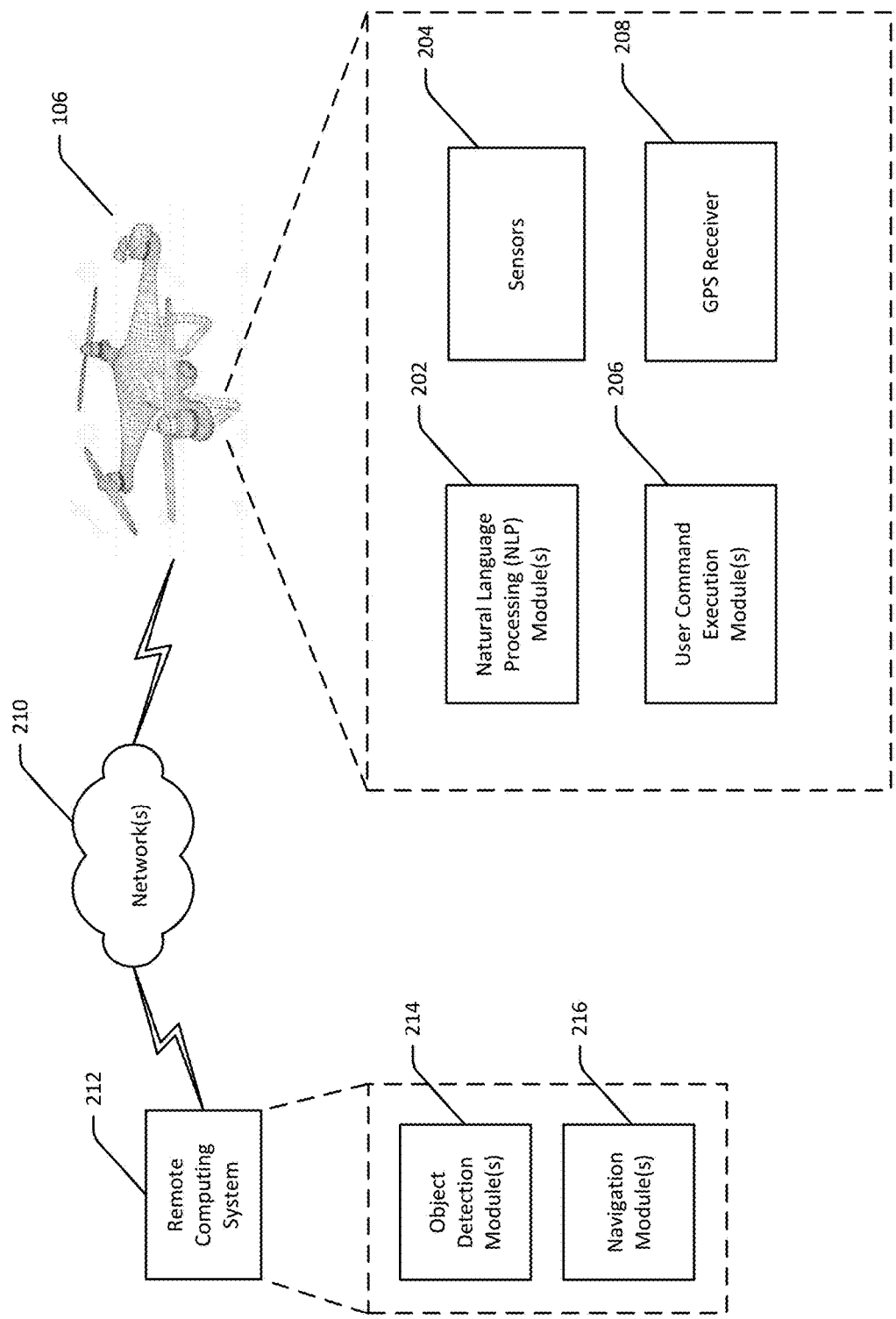
FIG. 2 is a schematic block diagram illustrating example components of a UAV and a remote system configured to communicate with each other over one or more networks in accordance with one or more example embodiments.
Figure 3:
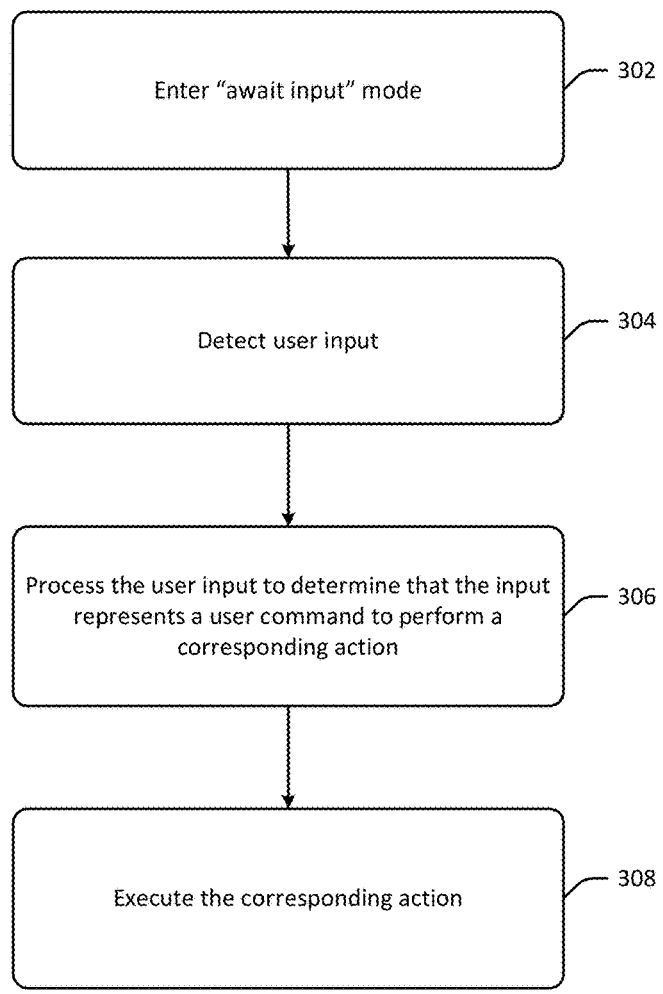
FIG. 3 is a process flow diagram of an illustrative method executable on a UAV to perform a desired action corresponding to a user command in accordance with one or more example embodiments.
Figure 4:
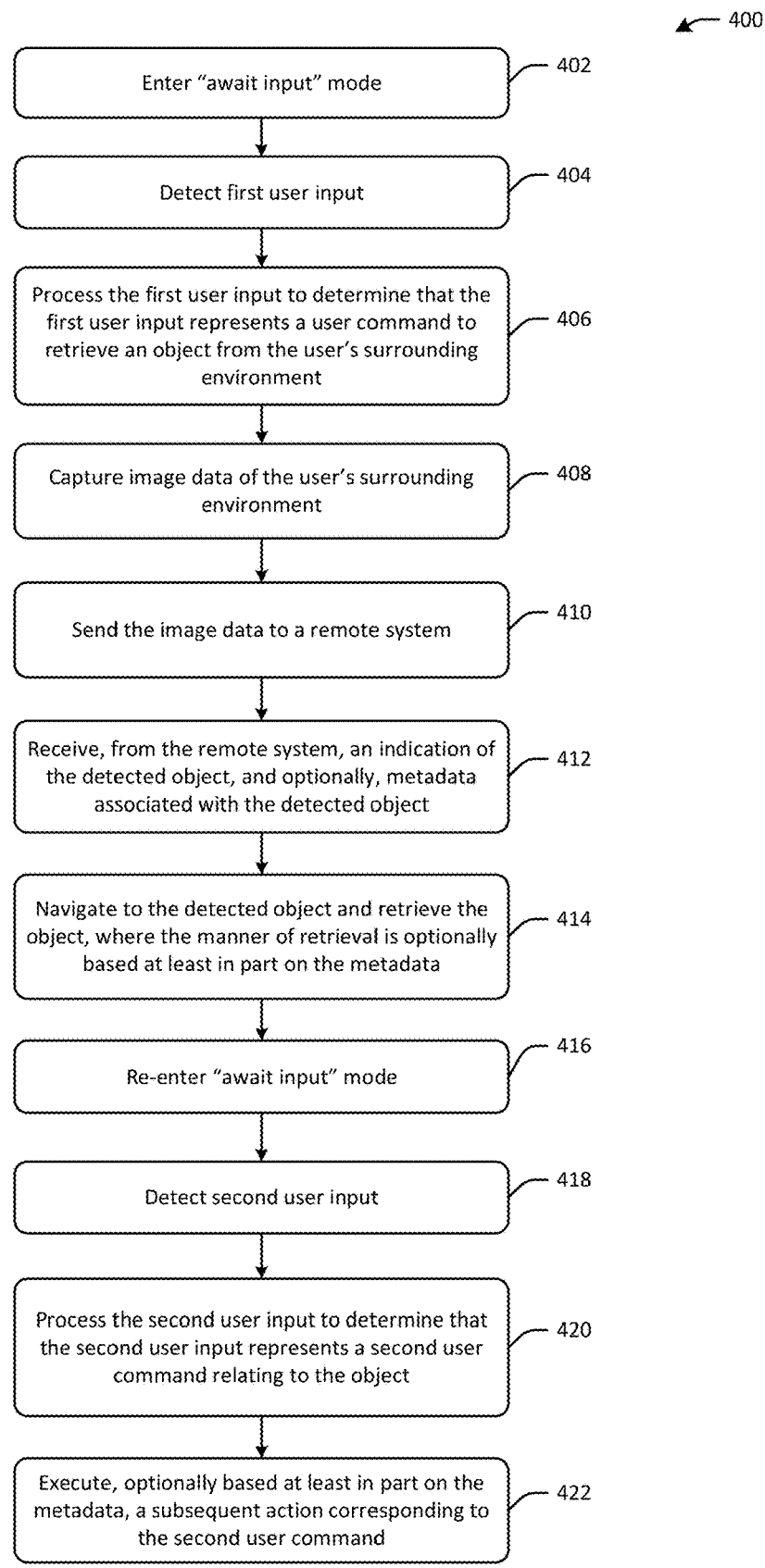
FIG. 4 is a process flow diagram of an illustrative method for object retrieval and delivery executable on a UAV in accordance with one or more example embodiments.

FIG. 1 is a schematic diagram illustrating various states associated with object retrieval and delivery using UAV in accordance with one or more example embodiments. FIG. 2 is a schematic block diagram illustrating example components of a UAV and a remote system configured to communicate with each other over one or more networks in accordance with one or more example embodiments. FIG. 3 is a process flow diagram of an illustrative method 300 executable on a UAV to perform a desired action corresponding to a user command in accordance with one or more example embodiments. FIG. 4 is a process flow diagram of an illustrative method 400 for object retrieval and delivery executable on a UAV in accordance with one or more example embodiments. FIGS. 3 and 4 will each be described in conjunction with FIGS. 1 and 2 hereinafter.

FIG. 1 depicts an environment 100 in which a user 102 and a UAV 106 are each present. The environment 100 may a region surrounding the user 102 that can be considered a workspace for a task the user 102 is performing. In example embodiments, the environment 100 includes a collection of objects 1 to N (any given object is referred to herein generically as object 108) that may include tools, components, or any other suitable object that the user 102 may need to complete a task.

Referring now to FIG. 3, at block 302 of the method 300, in example embodiments, the UAV 106 enters an "await input" mode. The "await-input" mode may be a default low-power mode that the UAV 106 operates in while waiting to detect input in the environment 100. In the "await input" mode, the UAV 106 may be hovering above a surface or may be stationary such as at a "home" location of the UAV. FIG. 2 depicts an illustrative configuration for the UAV 106. As depicted, the UAV 106 may include a GPS receiver 208 that determines GPS coordinates of a location in the environment 100 from which the UAV 106 initially takes off. This location may be the "home location" to which the UAV 106 is able to return based on its GPS coordinates. If the UAV 106 is a drone capable of operating in headless-mode, the drone may be able to return to its "home location" even in the absence of the GPS receiver 208 by simply flying backward.

At block 304 of the method 300, the UAV 106 may detect input in the environment 100. The input may be audial input received from the user 102. For example, the user input may take the form of a word or phrase spoken by the user 102. Alternatively, the user input may be gesture-based input or input provided to the UAV 106 via a handheld controller (not shown in the Figures) operable by the user 102.

At block 306 of the method 300, computer-executable instructions of one or more natural language processing modules 202 of the UAV 106 may be executed to process the user input received at block 304 to determine that the input represents a user command 104 to perform a corresponding action. For example, the UAV 106 may be configured with voice recognition and speech-to-text capabilities to parse the user input into a word or phrase representative of the user command 104. Alternatively, the UAV may relay the user input to a remote computing system 212 that is configured to perform the natural language processing on the input and return an indication of the corresponding user command 104 to the UAV 106. The UAV 106 and the remote computing system 212 may be configured to communicate via one or more networks 210. The network(s) 210 may include any suitable wired and/or wireless network including any of the types of networks described later in this disclosure in reference to FIG. 5.

At block 308 of the method 300, the UAV 106 may perform the action corresponding to the user command 104. In example embodiments, any of a variety of user commands may be issued to the UAV 106. Example user commands may include, without limitation, "take off," "land," "fly forward," "do a trick," "hover near me," "pick up an object," "drop off the object," and so forth. An illustrative method for object retrieval and delivery using the UAV 106 in which the user command 104 is "pick up [name of object]" or the like will now be described in reference to FIG. 4.

Referring now to FIG. 4, at block 402 of the method 400, in example embodiments, the UAV 106 enters the "await input" mode. As previously described, the "await-input" mode may be a default low-power mode that the UAV 106 operates in while waiting to detect input in the environment 100. At block 404 of the method 400, the UAV 106 may detect input in the environment 100. The input may be audial input received from the user 102; gesture-based input provided by the user 102; or input provided to the UAV 106 by the user 102 via a handheld controller (not shown in the Figures). In example embodiments in which gesture-based input is detected by the UAV 106, specific types of gestures may correspond to specific user commands. As a non-limiting example, a gesture that includes waiving one arm through the air may represent the user command "pick up [name of object]" while a gesture that includes waiving two arms through the air may represent the user command "drop off the object to [person X] or [location Y]."

At block 406 of the method 400, computer-executable instructions of the natural language processing module(s) 202 of the UAV 106 may be executed to process the user input received at block 404 to determine that the input represents a user command 104 to retrieve an object 108 from the environment 100. For example, the UAV 106 may be configured with voice recognition and speech-to-text capabilities to parse the user input into a word or phrase representative of the user command 104. Alternatively, the UAV may relay the user input to the remote computing system 212 which may be configured to perform the natural language processing on the input and return an indication of the corresponding user command 104 to the UAV 106.

At block 408 of the method 400, the UAV 106 may begin to traverse the environment 100 using a collection of onboard cameras and/or other sensors 204 to capture sensor data such as image data of the environment 100. The image data may include still frame image data, video data, or the like. Various ones of the sensors 204 may also capture other types of sensor data such as infrared emission data, motion data, or the like. While capturing the sensor data, the UAV 106 may traverse a predefined default flight path or a customized flight path that is more likely to result in earlier detection of the desired object 108. The operations at blocks 402-406 may occur in state 100A depicted in FIG. 1 and the operation at block 408 of capturing image data of the environment 100 may occur as part of a transition between state 100A and state 100B.

At block 410 of the method 400, the UAV 106 may send the captured image data to the remote computing system 212. The remote computing system 212 may be configured to perform object detection based on the received image data. For instance, in example embodiments, the remote computing system 212 may include one or more object detection modules 214 which may, in turn, include computer-executable instructions of a neural network (e.g., a convolutional neural network) trained to classify objects from the image data and ultimately detect the object 108 corresponding to the user command 104. In example embodiments, the neural network may have been trained using training image data supplied by the UAV 106. For instance, the UAV 106 may have previously conducted various test flights to capture image data of the environment 100 that was used as training data to train the neural network. In alternative example embodiments, if the UAV 106 has sufficient data storage and processing capacity, the UAV 106 may execute the trained neural network on-board and perform the object recognition/detection itself.

Once the object 108 is detected by the object detection module(s) 214, the remote computing system 212 may send an indication that the object 108 has been detected to the UAV 106 at block 412 of the method 400. In example embodiments, the remote computing system 212 may also send various metadata associated with the object 108 to the UAV 106. For instance, the UAV 106 may receive, from the remote computing system 212, Global Positioning System (GPS) coordinates indicative of a location of the object 108 in the environment 100. The UAV 106 may be equipped with a GPS receiver 208 that enables the UAV 106 to navigate, at block 414 of the method 400, to the location of the object 108 in the environment 100 using the received GPS coordinates of the object's location. In example embodiments, computer-executable instructions of one or more user command execution modules 206 may be executed to cause the UAV 106 to navigate to the object's location using the received GPS coordinates and to cause the UAV 106 to initiate and complete the retrieval protocol. In addition, in example embodiments, computer-executable instructions of one or more navigation modules 216 of the remote computing system 212 may be executed to determine and provide the UAV 106 with a most efficient flight path for retrieving the object 108. The most efficient flight path may be determined based on default or customizable parameters such as distance, time, number of potential obstacles along the flight path, or the like. Alternatively, the UAV 106 may determine the flight path on-board. In certain example embodiments, computer-executable instructions of the navigation module(s) 216 may be executed to remotely navigate the UAV 106 to the location of the object 108 in the environment 100.

In example embodiments, the UAV 106 may also receive other metadata associated with the object 108 at block 412 such as information identifying one or more attributes of the object 108. For instance, the UAV 106 may receive metadata indicating one or more materials from which the object 108 is constructed. The UAV 106 may also receive from the remote computing system 212 (or independently determine using data stored on-board the UAV 106) information indicative of a relative fragility of a material of the object 108 and information indicative of a manner in which the object 108 is to be retrieved based on its relative fragility. The retrieval protocol for the object 108 may specify, without limitation, the mechanism to be used to grasp the object 108 (e.g., a mechanical arm); the maximum amount of force that can be applied when grasping the object 108; a location on the object 108 at which the object 108 should be grasped; and so forth. For example, if the UAV 106 determines that the object 108 is primarily constructed from glass, the UAV 106 may not use more than a threshold amount of force while retrieving the object 108 at block 414 of the method 400 or may utilize a special grasping mechanism such as an arm having suction features to retrieve the object 108. As another non-limiting example, if the object is primarily constructed from a sturdier material such as wood or metal, the UAV 106 may utilize a greater amount of force to grasp the object 108. In certain example embodiments, there may be some ambiguity as to the relative fragility of an object 108, in which case, the user command 104 itself may convey this information to the UAV 106. An example user command in such a scenario may be "pick up the fragile glass vase."

In example embodiments, the UAV 106 may be pre-programmed to be aware of a maximum amount of object mass that the UAV 106 is capable of grasping and lifting. In certain example embodiments, the UAV 106 may receive metadata from the remote computing system 212 indicative of the mass of the detected object 108, or alternatively, determine or approximate the mass of the object 108 itself based, for example, on pre-programmed data or knowledge of material properties of the object 108. In some example embodiments, the UAV 106 may determine beforehand that the object 108 is too massive to be grasped and picked up. In other example embodiments, the UAV 106 may weigh the object 108 upon initially picking it, and if the measured weight exceeds the UAV's allowable weight threshold, may return the object 108 to its location. In yet other example embodiments, the UAV 106 may grasp the object 108 and attempt to fly with the object 108, and if the UAV 106 determines that one or more flight safety parameters are not met (e.g., a suitable altitude or velocity cannot be maintained), the UAV 106 may return the object 108 to its location.

Once the UAV 106 retrieves 110 the object 108 (e.g., grasps the object 108), the state may transition from state 100A to state 100B in FIG. 1. Retrieval 110 of the object 108 may correspond to the UAV 106 grasping the object 108, but remaining in a stationary position on a ground surface. Alternatively, retrieval 110 of the object 108 may include the UAV 106 grasping the object 108, lifting the object 108 off the ground, and hovering some distance above the ground with the object 108 grasped. After retrieving the object 108, the state may transition from state 100B to state 100C (FIG. 1), and the UAV 106 may again re-enter the "await input" mode to wait for a follow-up user command. While in the "await input" mode with the object 108 having been retrieved, the UAV 106 may detect additional user input at block 418 of the method 400.

At block 420 of the method 400, the natural language processing module(s) 202 may perform natural language processing on the additional user input detected at block 418 to determine that the additional user input is representative of a follow-up user command 112. The follow-up user command 112 may be, for example, any suitable command relating to the object such as "hold the object for X minutes," "bring the object to me," "drop the object off at [a specified location]," "drop the object off to [specified individual]," or the like. Then, at block 422 of the method 400, the user command execution module(s) 206 may be executed to cause the UAV 106 to perform a subsequent action corresponding to the follow-up user command 112. The subsequent action may include, for example, delivering 114 the object 108 to a target individual (e.g., the user 102) or a target location. Upon completion of the subsequent action, the state has transitioned from state 100C to state 100D (FIG. 1).

For user commands directing the UAV 106 to bring the object 108 to the user 102 or to drop the object 108 off at a specified location, the UAV 106 may utilize the on-board GPS receiver 208 to navigate to the user's location or another specified location using corresponding GPS coordinates. In other example embodiments, the user command 112 may be a directive to deliver the object 108 to another specified individual present in the environment 100. It should be appreciated that variations of example user commands described herein (e.g., variations in phrasing) are also within the scope of this disclosure. In example embodiments, if no follow-up user command is received within a predetermined amount of time, the UAV 106 may default to a standard setting which may include delivering the object 108 to a default target location in the environment 100. The default target location may be a current location of the user 102 or some other default location.

In example embodiments, the UAV 106 may rely on the object recognition/detection performed either on-board the UAV 106 or by the remote computing system 212 and/or metadata associated with the object 108 received from the remote computing system 212 to identify attributes of the object 108 that may impact the manner in which the object 108 is released or delivered to a target individual or location. For instance, the UAV 106 may determine that the object 108 is sharp, heavy, or otherwise presents a potential danger (e.g., the object 108 is a knife) and may release the object 108 at a slower rate and/or at a location that is a safe but accessible distance away from a target individual (e.g., the user 102 that issued the user command 112 or another specified individual).

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 5:
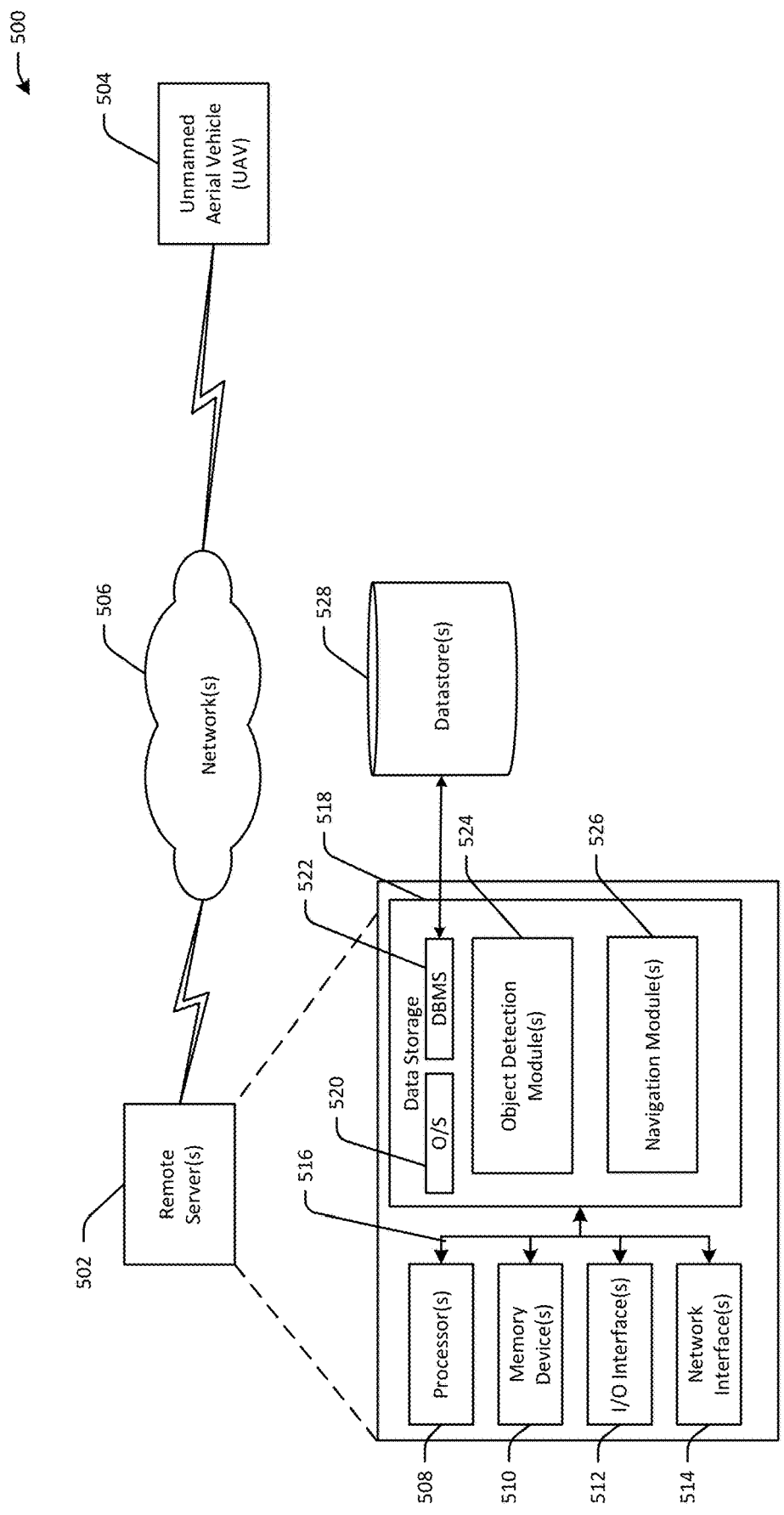
FIG. 5 is a schematic diagram of an illustrative networked architecture configured to implement one or more example embodiments.

FIG. 5 is a schematic diagram of an illustrative networked architecture 500 configured to implement one or more example embodiments of the disclosure. The networked architecture 500 may include one or more remote servers 502, which may be configured to communicate via one or more networks 506 with a UAV 504. The UAV 504 may be, for example, the UAV 106 having the illustrative components depicted in FIG. 2. While any particular component of the networked architecture 500 may be described herein in the singular, it should be appreciated that multiple instances of any such component may be provided, and functionality described in connection with a particular component may be distributed across multiple ones of such a component or across multiple components.

The network(s) 506 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 506 may have any suitable communication range associated therewith and may include, for example, global networks (e.g., the Internet), metropolitan area networks (MANs), wide area networks (WANs), local area networks (LANs), or personal area networks (PANs). In addition, the network(s) 506 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 502 may include one or more processors (processor(s)) 508, one or more memory devices 510 (generically referred to herein as memory 510), one or more input/output ("I/O") interface(s) 512, one or more network interfaces 514, and data storage 518. The remote server 502 may further include one or more buses 516 that functionally couple various components of the remote server 502.

The bus(es) 516 may include at least one of a system bus, a memory bus, an address bus, or a message bus, and may permit the exchange of information (e.g., data (including computer-executable code), signaling, etc.) between various components of the Remote server 502. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 510 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 518 may include removable storage and/or non-removable storage including, but not limited to, magnetic storage, optical disk storage, and/or tape storage. The data storage 518 may provide non-volatile storage of computer-executable instructions and other data. The memory 510 and the data storage 518, removable and/or non-removable, are examples of computer-readable storage media (CRSM) as that term is used herein.

The data storage 518 may store computer-executable code, instructions, or the like that may be loadable into the memory 510 and executable by the processor(s) 508 to cause the processor(s) 508 to perform or initiate various operations. The data storage 518 may additionally store data that may be copied to memory 510 for use by the processor(s) 508 during the execution of the computer-executable instructions. Moreover, output data generated as a result of execution of the computer-executable instructions by the processor(s) 508 may be stored initially in memory 510 and may ultimately be copied to data storage 518 for non-volatile storage.

More specifically, the data storage 518 may store one or more operating systems (O/S) 520; one or more database management systems (DBMS) 522 configured to access the memory 510 and/or one or more external datastores 528; and one or more program modules, applications, engines, managers, computer-executable code, scripts, or the like such as, for example, one or more object detection modules 524 and one or more navigation modules 526. Any of the components depicted as being stored in data storage 518 may include any combination of software, firmware, and/or hardware. The software and/or firmware may include computer-executable instructions (e.g., computer-executable program code) that may be loaded into the memory 510 for execution by one or more of the processor(s) 508 to perform any of the operations described earlier in connection with correspondingly named modules/services.

Although not depicted in FIG. 5, the data storage 518 may further store various types of data utilized by components of the remote server 502 (e.g., data stored in the datastore(s) 528). Any data stored in the data storage 518 may be loaded into the memory 510 for use by the processor(s) 508 in executing computer-executable instructions. In addition, any data stored in the data storage 518 may potentially be stored in the external datastore(s) 528 and may be accessed via the DBMS 522 and loaded in the memory 510 for use by the processor(s) 508 in executing computer-executable instructions.

The processor(s) 508 may be configured to access the memory 510 and execute computer-executable instructions loaded therein. For example, the processor(s) 508 may be configured to execute computer-executable instructions of the various program modules, applications, engines, managers, or the like of the remote server 502 to cause or facilitate various operations to be performed in accordance with one or more embodiments of the disclosure. The processor(s) 508 may include any suitable processing unit capable of accepting data as input, processing the input data in accordance with stored computer-executable instructions, and generating output data. The processor(s) 508 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 may be capable of supporting any of a variety of instruction sets.

Referring now to other illustrative components depicted as being stored in the data storage 518, the O/S 520 may be loaded from the data storage 518 into the memory 510 and may provide an interface between other application software executing on the remote server 502 and hardware resources of the remote server 502. More specifically, the O/S 520 may include a set of computer-executable instructions for managing hardware resources of the remote server 502 and for providing common services to other application programs. In certain example embodiments, the O/S 520 may include or otherwise control the execution of one or more of the program modules, engines, managers, or the like depicted as being stored in the data storage 518. The O/S 520 may include any operating system now known or which may be developed in the future including, but not limited to, any server operating system, any mainframe operating system, or any other proprietary or non-proprietary operating system.

The DBMS 522 may be loaded into the memory 510 and may support functionality for accessing, retrieving, storing, and/or manipulating data stored in the memory 510, data stored in the data storage 518, and/or data stored in external datastore(s) 528. The DBMS 522 may use any of a variety of database models (e.g., relational model, object model, etc.) and may support any of a variety of query languages. The DBMS 522 may access data represented in one or more data schemas and stored in any suitable data repository. Data stored in the datastore(s) 528 may include, for example, neural networks/classifiers for object detection; training data for the neural networks/classifiers; sensor data; GPS data; flight path data; and so forth. External datastore(s) 528 that may be accessible by the remote server 502 via the DBMS 522 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the remote server 502, the input/output (I/O) interface(s) 512 may facilitate the receipt of input information by the remote server 502 from one or more I/O devices as well as the output of information from the remote server 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 502 or may be separate. The I/O devices may further include, for example, any number of peripheral devices such as data storage devices, printing devices, and so forth.

The I/O interface(s) 512 may also include an interface for an external peripheral device connection such as universal serial bus (USB), FireWire, Thunderbolt, Ethernet port or other connection protocol that may connect to one or more networks. The I/O interface(s) 512 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The remote server 502 may further include one or more network interfaces 514 via which the remote server 502 may communicate with any of a variety of other systems, platforms, networks, devices, and so forth such as, for example, the UAV 504. The network interface(s) 514 may enable communication, for example, with the UAV 504 via one or more of the network(s) 506.

It should be appreciated that the program modules depicted in FIG. 5 as being stored in the data storage 518 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the remote server 502 and/or other computing devices accessible via one or more networks, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peerto-peer model, and so forth. In addition, any of the functionality described as being supported by any of the modules depicted in FIG. 5 may be implemented, at least partially, in hardware and/or firmware across any number of devices.

It should further be appreciated that the remote server 502 may include alternate and/or additional hardware, software, or firmware components beyond those described or depicted without departing from the scope of the disclosure. More particularly, it should be appreciated that software, firmware, or hardware components depicted as forming part of the remote server 502 are merely illustrative and that some components may not be present or additional components may be provided in various embodiments. While various illustrative modules have been depicted and described as software modules stored in data storage 518, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 300 and/or the method 400 may be performed by a remote server 502 having the illustrative configuration depicted in FIG. 5, or more specifically, by one or more program modules, engines, applications, or the like executable on such a device. The method 300 and/or the method 400 may be performed in a distributed fashion between the remote server 502 and the UAV 504 (which have the illustrative configuration of the UAV 106 depicted FIG. 2). It should be appreciated, however, that such operations may be implemented in connection with numerous other device/server/system configurations.

The operations described and depicted in the illustrative methods of FIGS. 3 and 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3 and 4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for object retrieval and delivery executable on an unmanned aerial vehicle (UAV), the method comprising:
    detecting, by a computer processor of the UAV, user input in an environment surrounding a user and the UAV, wherein the user input is first user input and the user command is a first user command;
    processing, by the computer processor, the user input to determine that the user input represents a user command to retrieve an object present in the environment;
    capturing, by one or more sensors of the UAV, image data of the environment;
    detecting the object in the environment based at least in part on the image data;
    causing, by the computer processor, the UAV to navigate to a location of the object in the environment to retrieve the object;
    causing, by the computer processor, the UAV to perform a subsequent action after retrieval of the object;
    detecting, by the computer processor, second user input in the environment after retrieving the object;
    processing, by the computer processor, the second user input to determine that the second user input represents a second user command relating to the object; and
    determining the subsequent action to be performed in response to the second user command,
    wherein the subsequent action comprises one of: releasing the object at a location of the user, releasing the object at a default location, releasing the object at a location specified by the user, or hovering with the object.

2. The method of claim 1, wherein processing the user input comprises performing natural language processing of the user input to determine the user command.

3. The method of claim 1, wherein detecting the object in the environment comprises:
    streaming, by the computer processor, the image data to a remote system for object recognition analysis; and
    receiving, by the computer processor, an indication that the remote system has detected the object in the environment.

4. The method of claim 3, further comprising receiving, by the computer processor, metadata associated with the object from the remote system, wherein the metadata comprises Global Positioning System (GPS) coordinates indicative of the location of the object in the environment, and wherein causing, by the computer processor, the UAV to navigate to the location of the object in the environment comprises providing the GPS coordinates to a GPS receiver of the UAV to enable navigation of the UAV to the location of the object in the environment.

5. The method of claim 3, further comprising:
    receiving, by the computer processor, metadata associated with the object from the remote system, wherein the metadata comprises an indication of an attribute of the object;
    determining, by the computer processor, a retrieval protocol for the object based at least in part on the attribute; and
    causing, by the computer processor, the UAV to retrieve the object using the retrieval protocol.

6. The method of claim 5, wherein the attribute is a material of the object, and wherein the retrieval protocol specifies a maximum amount of force to be applied by the UAV on the object during retrieval.

7. An unmanned aerial vehicle (UAV) for object retrieval and delivery, comprising:
- at least one on-board memory storing computer-executable instructions; and
- at least one processor, wherein the at least one processor is configured to access the at least one on-board memory and execute the computer-executable instructions to:
  - detect user input in an environment surrounding a user and the UAV, wherein the user input is first user input and the user command is a first user command;
  - process the user input to determine that the user input represents a user command to retrieve an object present in the environment;
  - capture, by one or more sensors of the UAV, image data of the environment;
  - detect the object in the environment based at least in part on the image data;
  - cause the UAV to navigate to a location of the object in the environment to retrieve the object;
  - cause the UAV to perform a subsequent action after retrieval of the object; detect second user input in the environment after retrieving the object;
  - process the second user input to determine that the second user input represents a second user command relating to the object; and
  - determine the subsequent action to be performed in response to the second user command,
  - wherein the subsequent action comprises one of: releasing the object at a location of the user, releasing the object at a default location, releasing the object at a location specified by the user, or hovering with the object.

8. The UAV of claim 7, wherein the at least one processor is configured to process the user input by executing the computer-executable instructions to perform natural language processing of the user input to determine the user command.

9. The UAV of claim 7, wherein the at least one processor is configured to detect the object in the environment by executing the computer-executable instructions to:
- stream the image data to a remote system for object recognition analysis; and
- receive an indication that the remote system has detected the object in the environment.

10. The UAV of claim 9, wherein the at least one processor is further configured to execute the computer-executable instructions to receive metadata associated with the object from the remote system, wherein the metadata comprises Global Positioning System (GPS) coordinates indicative of the location of the object in the environment, and wherein the at least one processor is configured to cause the UAV to navigate to the location of the object in the environment by executing the computer-executable instructions to provide the GPS coordinates to a GPS receiver of the UAV to enable navigation of the UAV to the location of the object in the environment.

11. The UAV of claim 9, wherein the at least one processor is further configured to execute the computer-executable instructions to:
- receive metadata associated with the object from the remote system, wherein the metadata comprises an indication of an attribute of the object;
- determine a retrieval protocol for the object based at least in part on the attribute; and
- cause the UAV to retrieve the object using the retrieval protocol.

12. The UAV of claim 11, wherein the attribute is a material of the object, and wherein the retrieval protocol specifies a maximum amount of force to be applied by the UAV on the object during retrieval.

13. A computer program product for object retrieval and delivery using a voice-controlled unmanned aerial vehicle (UAV), the computer program product comprising a storage medium readable by a processing circuit of the UAV, the storage medium storing instructions executable by the processing circuit to cause a method to be performed, the method comprising:
- detecting user input in an environment surrounding a user and the UAV, wherein the user input is first user input and the user command is a first user command;
- processing the user input to determine that the user input represents a user command to retrieve an object present in the environment;
- capturing, by one or more sensors of the UAV, image data of the environment;
- detecting the object in the environment based at least in part on the image data;
- causing the UAV to navigate to a location of the object in the environment to retrieve the object; and
- causing the UAV to perform a subsequent action after retrieval of the object;
- detecting, by the computer processor, second user input in the environment after retrieving the object;
- processing, by the computer processor, the second user input to determine that the second user input represents a second user command relating to the object; and
- determining the subsequent action to be performed in response to the second user command,
- wherein the subsequent action comprises one of: releasing the object at a location of the user, releasing the object at a default location, releasing the object at a location specified by the user, or hovering with the object.

14. The computer program product of claim 13, wherein processing the user input comprises performing natural language processing of the user input to determine the user command.

15. The computer program product of claim 13, wherein detecting the object in the environment comprises:
- streaming the image data to a remote system for object recognition analysis; and
- receiving an indication that the remote system has detected the object in the environment.

16. The computer program product of claim 15, the method further comprising receiving metadata associated with the object from the remote system, wherein the metadata comprises Global Positioning System (GPS) coordinates indicative of the location of the object in the environment, and wherein causing the UAV to navigate to the location of the object in the environment comprises providing the GPS coordinates to a GPS receiver of the UAV to enable navigation of the UAV to the location of the object in the environment.

17. The computer program product of claim 15, the method further comprising:
- receiving metadata associated with the object from the remote system, wherein the metadata comprises an indication of an attribute of the object, and wherein the attribute is a material of the object;
- determining a retrieval protocol for the object based at least in part on the attribute, wherein the retrieval protocol specifies a maximum amount of force to be applied by the UAV on the object during retrieval; and causing the UAV to retrieve the object using the retrieval protocol.

18. The computer program product of claim 13, wherein the user input is first user input and the user command is a first user command, the method further comprising:
- detecting second user input in the environment after retrieving the object;
- processing the second user input to determine that the second user input represents a second user command relating to the object; and
- determining the subsequent action to be performed in response to the second user command,
- wherein the subsequent action comprises one of: releasing the object at a location of the user, releasing the object at a default location, releasing the object at a location specified by the user, or hovering with the object.

* * * * *